United States Patent
Haravu et al.

(10) Patent No.: US 10,089,773 B1
(45) Date of Patent: Oct. 2, 2018

(54) ANIMATED ARRAY PERFORMANCE DASHBOARD

(71) Applicant: EMC Corporation, Hopkinton, MA (US)

(72) Inventors: Nagasimha G. Haravu, Apex, NC (US); Bruce Rabe, Dedham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 301 days.

(21) Appl. No.: 14/755,095

(22) Filed: Jun. 30, 2015

(51) Int. Cl.
| G06T 13/80 | (2011.01) |
| G06F 3/0484 | (2013.01) |
| G09G 5/02 | (2006.01) |
| G06T 11/00 | (2006.01) |

(52) U.S. Cl.
CPC .......... G06T 13/80 (2013.01); G06F 3/04842 (2013.01); G06F 3/04847 (2013.01); G06T 11/001 (2013.01); G09G 5/026 (2013.01); *G06T 2200/24* (2013.01); *G09G 2320/08* (2013.01); *G09G 2320/10* (2013.01); *G09G 2354/00* (2013.01)

(58) Field of Classification Search
CPC ..... G06T 13/80; G06T 2200/24; G06F 11/34; G06F 11/30; G06F 3/04842; G06F 3/04847; G06F 17/30144; G06F 11/00; G06F 11/3051; G06F 11/3055; G06F 11/3058; G06F 11/32; G06F 11/324; G06F 11/328; G06F 11/3409; G06F 17/30129; G06F 17/30138
See application file for complete search history.

(56) References Cited

U.S. PATENT DOCUMENTS

| 9,203,894 | B1 | 12/2015 | Ginzburg |
| 9,497,136 | B1 | 11/2016 | Ramarao et al. |
| 9,612,802 | B1 | 4/2017 | Cox et al. |
| 9,734,674 | B1 | 8/2017 | Rabe et al. |
| 9,836,982 | B1 | 12/2017 | Harvey et al. |

(Continued)

OTHER PUBLICATIONS

Veeam Software, Veeam ONE User Guide [online], Jun. 3, 2015, [Jun. 8, 2017] Retrieved from the Internet <URL: https://helpcenter.veeam.com/one/80/vsphere/index.html and https://helpcenter.veeam.com/one/80/vsphere/index.html?color_settings.html>.*

*Primary Examiner* — Jeffrey A Gaffin
*Assistant Examiner* — Bille M Dahir
(74) *Attorney, Agent, or Firm* — BainwoodHuang

(57) ABSTRACT

Examples are generally directed towards an animated performance dashboard. An animated performance dashboard including a plurality of performance indicators representing a plurality of selected objects is generated. A performance indicator includes a color overlay. The color overlay of a given performance indicator identifies a performance status of at least one object at a given point in time relative to a selected metric and a performance threshold. The animated performance dashboard animates changes in performance status of one or more objects at a plurality of points within a time range by changing a first color overlay of one or more performance indicators identifying a first performance status of one or more objects at a first point in time to a second color overlay identifying a second performance status of the one or more objects at a second point in time within the time range.

19 Claims, 11 Drawing Sheets

(56) References Cited

U.S. PATENT DOCUMENTS

| | | | | |
|---|---|---|---|---|
| 2012/0311475 | A1* | 12/2012 | Wong | G06F 11/3003 715/772 |
| 2013/0159910 | A1* | 6/2013 | Bostic | G06F 11/3048 715/772 |
| 2015/0293830 | A1* | 10/2015 | Bhide | G06F 9/45533 718/1 |
| 2016/0026552 | A1* | 1/2016 | Holden | G06F 8/65 709/224 |
| 2016/0359683 | A1* | 12/2016 | Bartfai-Walcott | H04L 41/5009 |

* cited by examiner

ANIMATED ARRAY PERFORMANCE DASHBOARD

CROSS-REFERENCE TO RELATED APPLICATION

This application is related to non-provisional U.S. patent application Ser. No. 14/755,118 and titled "Sonification of Performance Metrics" filed on Jun. 30, 2015.

BACKGROUND

Performance related information associated with a computing device may be gathered from a variety of physical and logical components of the computing device. For example, performance information may be gathered from processors, hard disks, flash drives, ports, logical drives, file systems, as well as other components. The performance information for a single component may be obtained in a chart with time on the x-axis for that single component.

If a user requires performance information for more than a single component in a system, the information typically is scattered over several different visual screens, charts, tables, and/or graphs representing the different components. In some situations, performance information for multiple components may be available in a static heat map. However, a heat map only provides performance information for a single point in time.

In order to view performance data for more than one component of a system related to performance of the components at multiple different points in time, the user is typically required to manually search multiple sources of performance information provided on multiple different screens. The user may then be required to manually attempt to consolidate the disparate performance information for analysis. This is a painstaking, tedious, laborious, and inefficient process for users which may result in unrecognized, undiagnosed, and/or unresolved performance issues within the system.

SUMMARY

Examples of the disclosure provide an animated performance dashboard. In an example, a plurality of performance status updates for a plurality of objects is received. The plurality of performance status updates correspond to a plurality of points within a time range. A performance status update identifies a performance status of a given object at a given point in time within the time range. A plurality of performance indicators corresponding to the plurality of performance status updates is generated within an animated performance dashboard display by a user interface. A performance indicator includes a color overlay indicating the performance status of the given object relative to a performance threshold. The animated dashboard display includes a first color overlay associated with at least one performance indicator identifying a first performance status of at least one given object at a first point in time. The first color overlay is changed to a second color overlay identifying a second performance status of at least one object at a second point in time within the time range to animate changes in the performance status of the plurality of objects during the time range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
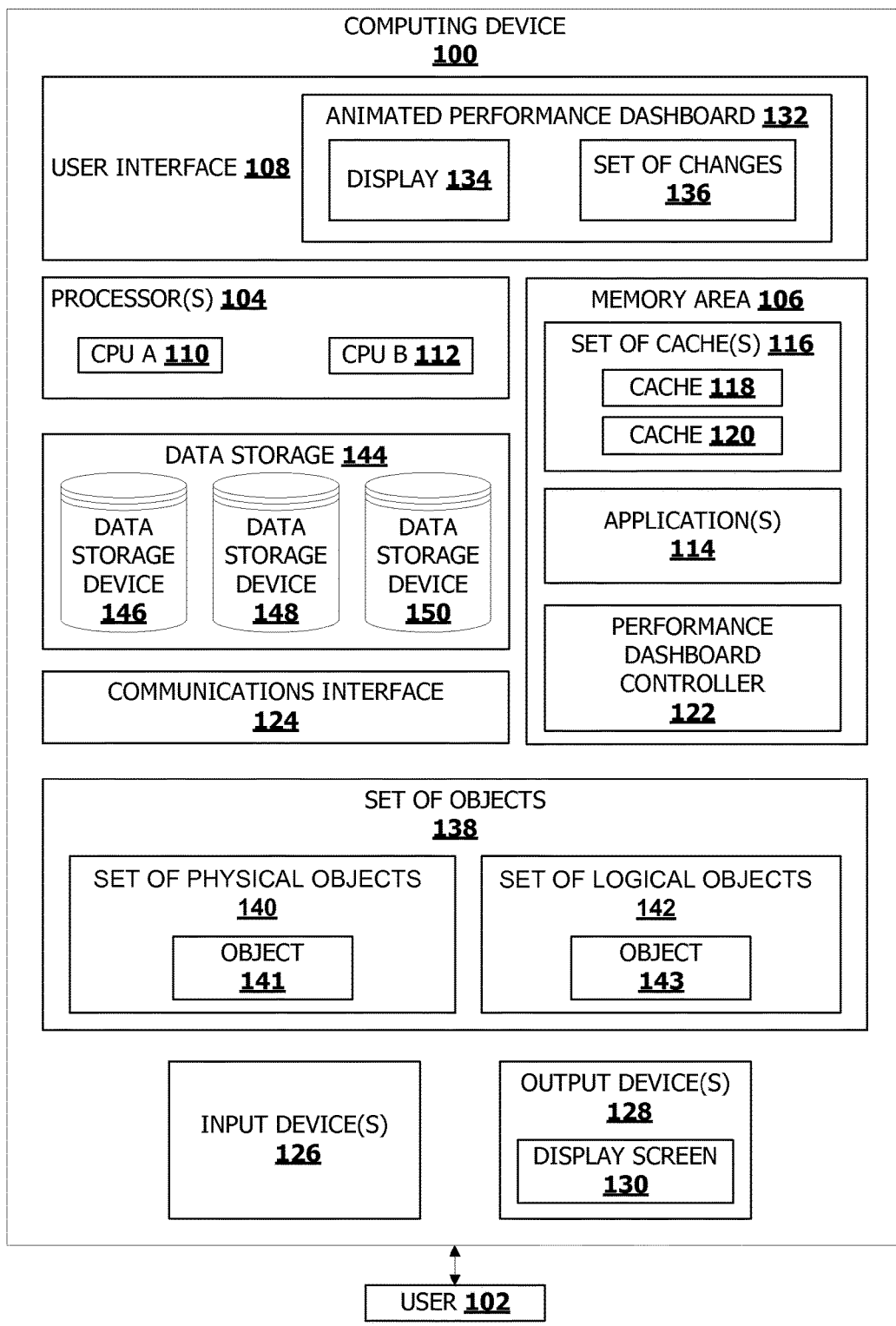
FIG. 1 is an exemplary block diagram illustrating a system for generating an animated performance dashboard display.

Referring to the figures, examples of the disclosure provide animation of performance metric data associated with multiple components of a computing device. Aspects of the disclosure provide an animated performance dashboard display. The animated performance dashboard display presents performance metric data for a plurality of objects of a computing device to the user in a single, animated performance dashboard display screen. This enables a user to view performance information for multiple components in a more efficient and user-friendly manner.

Aspects of the disclosure further enable a user to gain more efficient access to performance information by presenting the performance information in a single source and common format. The animated performance dashboard display is presented within a user interface, such as a graphical user interface. This enables users to identify performance problems associated with one or more components of a computing device by reference to a single display screen, improving user efficiency via user interface interaction and increases user interaction performance Aspects of the disclosure further provide an animated performance dashboard which consolidates performance metric data from a plurality of different objects into a single display instead of requiring a user to view performance information for different objects in multiple different screens. The animated display permits a user to discover trends in performance of various different objects associated with a computing device over time with greater efficiency and accuracy.

The consolidation of performance information further increases the speed with which a user may obtain relevant and/or desired performance metric data. The utilization of a single animated performance dashboard display to animated changes in performance metric data over time further conserves memory and reduces processor load by reducing the number of display screens a user must access and display to obtain the desired performance metric data.

Further aspects of the disclosure stores performance status updates in a database for easy and efficient retrieval by the performance dashboard controller. This reduces network bandwidth usage and processor load by further reducing the number of queries and/or searches are performed by the user and/or by the performance dashboard controller attempting to obtain the performance metric data for a plurality of different objects.

Finally, aspects of the disclosure provides animated performance indicators with changing color overlays to indicate changes in performance of a given object over time relative to a selected metric and a selected threshold. This enables the user to quickly and efficiently identify trend in performance of multiple different objects over time, identify a performance problem, and diagnose the root cause of the performance problem more quickly, accurately, and efficiently. In other words, the animated performance dashboard display assists users in reducing the error rate in diagnosing and solving performance related problems associated with one or more objects in a computer system.

Thus, the animated performance dashboard display enables increased recognition of performance problems, as well as improved diagnosis and resolution of those performance problems for improved overall computer system performance. The animated performance dashboard display permits the storage administrator to play back the display over a period of time, performance in motion, to see trends as they develop. This animated performance dashboard enables increased recognition of performance problems and improved diagnosis of performance issues by for improved overall computer system performance.

FIG. 1 is an exemplary block diagram illustrating a system for generating an animated performance dashboard display. In the example of FIG. 1, the computing device 100 associated with a user 102 represents a system for animating performance metric data for a plurality of objects associated with computing device 100 relative to a performance threshold.

The computing device 100 represents any device executing instructions (e.g., as application programs, operating system functionality, or both) to implement the operations and functionality associated with the computing device 100. In some examples, the computing device 100 is a storage system, such as, but without limitation, a data storage system or cloud storage system.

In other examples, the computing device 100 may include a mobile computing device or any other portable device. In some examples, the mobile computing device includes a mobile telephone, laptop, tablet, computing pad, netbook, gaming device, and/or portable media player.

The computing device 100 may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device 100 has at least one processor 104, a memory area 106, and at least one user interface 108. The one or more processor(s) includes any quantity of processing units. In some examples, the processor(s) 104 includes central processing unit (CPU) A 110 and/or central processing unit (CPU) B 112. In other examples, the processor(s) 104 may include only a single processing unit, as well as three or more processing units.

The one or more processor(s) 104 are programmed to execute computer-executable instructions for implementing aspects of the disclosure. The instructions may be performed by a single processor or by multiple processors within the computing device 100, or performed by a processor external to the computing device 100. In some examples, the processor(s) 104 are programmed to execute instructions such as those illustrated in the figures (e.g., FIG. 9, FIG. 10, FIG. 11, FIG. 12, and/or FIG. 13).

In some examples, the processor(s) 104 represent an implementation of analog techniques to perform the operations described herein. For example, the operations may be performed by an analog computing device and/or a digital computing device.

The computing device 100 further has one or more computer readable media such as the memory area 106. The memory area 106 includes any quantity of media associated with or accessible by the computing device 100. The memory area 106 may be internal to the computing device (as shown in FIG. 1), external to the computing device (not shown), or both (not shown). In some examples, the memory area 106 includes read-only memory (ROM) and/or memory wired into an analog computing device.

The memory area 106 stores, among other data, one or more application(s) 114. The application(s) 114, when executed by the processor(s) 104, operate to perform functionality on the computing device 100. Exemplary application(s) 114 include mail application programs, web browsers, calendar application programs, address book application programs, messaging programs, media applications, location-based services, search programs, and the like. The application(s) 114 may communicate with counterpart applications or services such as web services accessible via a network (not shown). For example, the application(s) 114 may represent downloaded client-side applications that correspond to server-side services executing in a cloud.

The memory area 106 further stores a set of cache(s) 116. The set of cache(s) may optionally include one or more caches, such as, but without limitation, cache 118 and cache 120. In other example, the cache(s) may include a single cache, as well as three or more caches. In some examples, the set of cache(s) 116 includes a read cache and/or a write cache.

The memory area further stores one or more computer-executable components. Exemplary components include a performance dashboard controller 122. The performance dashboard controller 122 component, when executed by the processor(s) 104 of the computing device 100, causes the processor(s) 104 to derive a plurality of performance status updates corresponding to a plurality of points within a time range based on performance metric data for at least one object and a threshold. The performance dashboard controller 122, when further executed by the processor(s) 104 to further generates an animated performance dashboard display including a plurality of performance indicators including color overlays that, when played within a display device, identifies changes in performance status of the at least one object during the time range relative to a selected metric and a performance threshold associated with the selected metric.

In some examples, a communications interface 124 includes a network interface card and/or computer-executable instructions (e.g., a driver) for operating the network interface card. Communication between the computing device 100 and other devices may occur using any protocol or mechanism over any wired or wireless connection. In some examples, the communications interface 124 component is operable with short range communication technologies, such as by using near-field communication (NFC) tags.

In some examples, the user interface 108 includes a graphics card for displaying data to the user 102 and receiving data from the user 102. The user interface 108 component may also include computer-executable instructions (e.g., a driver) for operating the graphics card. Further, the user interface 108 may include a display (e.g., a touch screen display or natural user interface) and/or computer-executable instructions (e.g., a driver) for operating the display. In some examples, the user interface 108 is a graphical user interface (GUI). In other examples, the user interface 108 includes a browser.

The computing device 100 may also include one or more input device(s) 126 and one or more output device(s) 128 to provide data to the user 102 or receive data from the user 102. The input device(s) 126 and output device(s) 128 may include, without limitation, one or more speakers, a sound card, a camera, a microphone, a vibration motor, one or more accelerometers, a BLUETOOTH brand communication module, global positioning system (GPS) hardware, and a photoreceptive light sensor. For example, the user 102 may input commands or manipulate data by moving the computing device 100 in a particular way.

In some examples, the output device(s) 128 includes a display screen, such as a monitor, liquid crystal display (LCD), touch screen, plasma screen, or any other type of visual display device for displaying graphics and/or other images. In these examples, the animated performance dashboard 132 displays an animated performance dashboard display 134 including the performance indicators having color overlays representing a set of changes 136 in performance status of a set of objects 138 occurring during a selected time range on a visual output medium, such as display screen 130 of output device(s) 128.

The set of objects 138 is a set of one or more objects associated with a computing device. The set of objects 138 may be objects associated with this computing device 100 or objects associated with a remote computing device.

The set of objects 138 may include a set of physical objects 140. A set of physical objects 140 may include one or more processor(s), one or more disks, one or more flash drive(s), one or more port(s), or any other physical components having performance metric data associated with it.

For example, the set of physical objects may include data storage 144 including at least one data storage device, such as data storage devices 146, 148, and 150. In some examples, the one or more data storage device(s) 214 may include a data storage array. The data storage device(s) 214 may also include one or more types of data storage devices, such as, for example, one or more hard disk drives (HDD) and/or one or more solid state drives (SSDs), such as a flash drive.

The set of objects 138 may include a set of logical objects 142. A set of logical objects 142 may include one or more logical units (LUNs), one or more file systems, or any other logical components associated with computing device 100 for which performance metric data is available.

The set of objects 138 may also include one or more pools. A pool may be associated with physical objects or logical objects.

Figure 2:
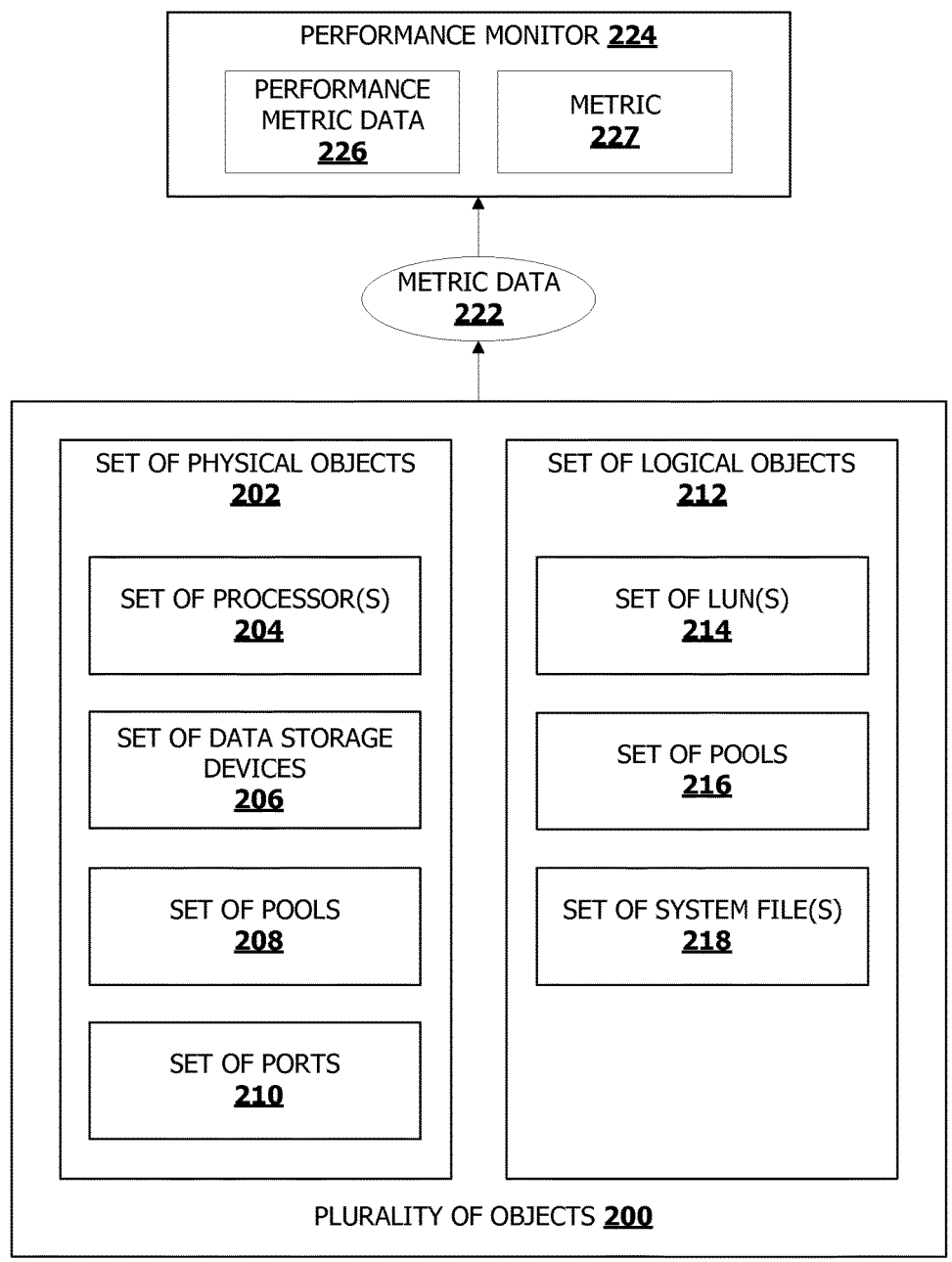
FIG. 2 is an exemplary block diagram illustrating a performance monitor for gathering performance metric data for a plurality of objects.

FIG. 2 is an exemplary block diagram illustrating a performance monitor for gathering performance metric data for a plurality of objects. Plurality of objects 200 includes two or more objects associated with a computing device. The computing device may be a data processing system, a storage system, cloud storage, a personal computer, a tablet computer, a smart phone, or any other type of computing device for which metric data is available.

The plurality of objects 200 may optionally include a set of physical objects 202. The set of physical objects in this example is a set of one or more physical objects.

The set of physical objects may optionally include a set of processor(s) 204, a set of data storage devices 206, a set of pools 208, a set of ports, 210, as well as any other type of physical component associated with a computing device. As used herein, the term set includes one or more. For example, the set of processor(s) 204 includes one or more processors. Likewise, the set of ports 210 is a set of one or more ports. A port is a network port, such as, but without limitation, an Ethernet Port or a Fibre Channel (FC) port.

The set of data storage devices 206 may include hard disk drive (HDD) rotating disks, flash drives, optical disks, redundant array of independent disks (RAID) array or any other type of physical data storage device.

The plurality of objects 200 may also optionally include a set of logical objects 212. The set of logical objects 212 is a set of one or more logical objects. A set of logical objects 212 may include a set of logical units (LUNs) 214. The set of LUNs 214 in some examples includes LUNs on a storage array.

The set of logical objects 212 optionally includes a set of pools 216. The set of pools 216 includes one or more storage pools. Each storage pool in the set of pools 216 may have a different size or capacity.

The set of logical objects 212 may also optionally include a set of file system(s) 218. The set of file system(s) 218 may include one or more file system(s).

The set of logical objects 212 optionally may include other logical objects not shown in FIG. 2. For example, but without limitation, the set of logical objects 212 may include one or more logical volumes, logical disks, or any other type of logical objects associated with the computing device and having metric data 222 associated therewith.

The metric data 222 includes the data identifying performance of the object based on a selected metric and a time stamp indicating the point in time at which the metric data was collected. A metric is a unit of measure for determining performance of a computing device object at a given point in time. The metric may include any type of metric for measuring or quantifying performance of a physical or logical object. Non-limiting examples of performance metrics include latency, processor speed, processor utilization, temperature, bandwidth usage or traffic, capacity, queue length, cache hit ratio, or any other metric.

A given point in time is a fixed or static time, such as three o'clock (3:00) or fifteen minutes after twelve in the afternoon (12:15 pm). The time stamp may indicate the point in time even more specifically. For example, the time stamp may include the time in hours, minutes, seconds, and milliseconds. For example, a given point in time may be fifteen minutes and three seconds after one o'clock in the afternoon (1:15:03 p.m.). Thus, if the selected object is a processor, the selected metric is percentage utilization, the performance status data may indicate that the utilization of the processor at forty-five minutes and 52 seconds after seven o'clock p.m. (7:45:52 p.m.) the percentage utilization was fifty-one percent (51%). Thus, metric data is data measuring a performance of one or more computing device objects at a given point in time.

A performance monitor 224 component collects metric data 222 from the plurality of objects 200. The performance monitor 224 may be implemented as a physical hardware monitor for collecting performance data associated with one or more objects, a software component comprising computer executable instructions executing on one or more processors, or a combination of hardware and software components for polling one or more objects for metric data and storing the performance metric data in a database.

The metric data 222 may be metric data associated with a single metric or metric data associated with two or more different metrics. The metric data 222 in some examples is metric data collected for a single object. In other examples, the metric data 222 is metric data collected from two or more objects in the plurality of objects. The performance monitor stores the collected metric data 222 as performance metric data 226 within a database until it is needed by the performance dashboard controller. In some examples, the database is a relational database.

The performance metric data 226 is data associated with a selected metric 227. In some examples, the performance metric data 226 is collected from a single object. In other examples, the performance metric data 226 includes metric data associated with two or more different objects. The performance metric data 226 may also include metric data collected from a related group of objects, such as a group of disks in a storage array.

The performance dashboard controller generates a plurality of performance status updates for an object based on the performance metric data 226, at least one performance threshold, and a user selected time interval and/or user selected time range. The pluralities of performance status updates are utilized to generate the animated performance dashboard display for one or more objects.

The performance dashboard controller may utilize the plurality of performance status updates to create an animated performance dashboard display representing a plurality of objects. Alternatively, the performance dashboard controller may identify the performance indicator associated with a set of color overlays for a particular object based on a plurality of performance status updates for the object. In other words, the performance dashboard controller in some examples generates each performance indicator dynamically in real-time. In other examples, the performance dashboard controller identifies a pre-generated performance indicator associated with a set of color overlays and retrieves that pre-generated performance indicator from a database for display within the animated performance dashboard display.

Figure 3:
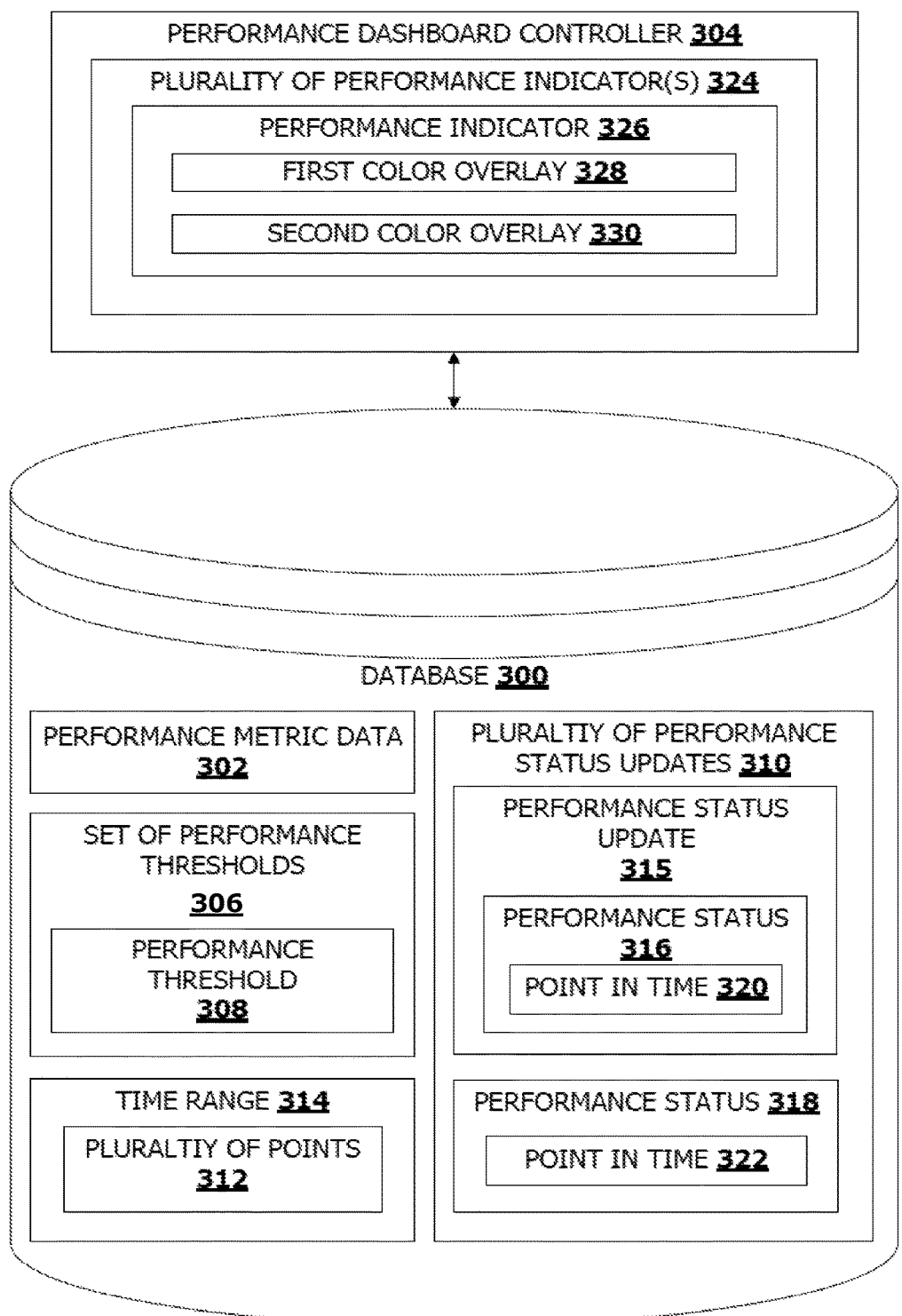
FIG. 3 is an exemplary block diagram illustrating generation of performance indicators.

FIG. 3 is an exemplary block diagram illustrating generation of performance indicators. In some examples, database 300 stores performance metric data 302 for at least one object. The database 300 in some examples is a relational database. The database 300 stores the performance metric data 302 gathered by the performance monitor.

The performance metric data 302 includes data measuring, quantifying, or describing the performance of an object at a given point in time for at least one selected metric. The metric may be a user selected metric or a default metric. The performance metric data 302 also includes time stamps identifying various points in time at which metric data for a given object was measured to identify a performance of the object in terms of the selected metric.

Performance dashboard controller 304 is a component that generates an animated performance dashboard display representing a changing performance status of a plurality of objects relative to one or more performance thresholds. The performance dashboard controller 304 may filter the performance metric data 302 based on read operations, write operations, operations associated with one or more applications, or any other type of operations. The performance metric data 302 may be filtered based on one or more selected types of operations and/or applications to generate performance indicators that are more relevant or of greater interest to the user.

For example, a user may wish to determine whether a particular application or types of operations are influencing the performance of the cache or processor performance. Thus, filtering the performance metric data 302 permits the user to identify objects and object performance that is being influenced or affected by particular applications or other operations.

In other examples, performance metric data 302 is filtered in accordance with one or more read operations. In these examples, the performance metric data 302 if filtered for metric data associated with performance of objects associated with one or more read operations. The filtered performance metric data 302 includes metric data for objects that are active during the one or more read operations and/or objects whose performance is influenced by the one or more read operations. In some examples, the animated performance dashboard only shows changes in performance status of objects that are active during the one or more read operations.

In still other examples, performance metric data 302 is filtered in accordance with one or more write operations. In these examples, the performance metric data 302 if filtered for metric data associated with performance of objects associated with one or more read operations. The filtered performance metric data 302 includes metric data for objects that are active during the one or more write operations and/or objects whose performance is influenced by the one or more write operations. In some examples, the animated performance dashboard only shows changes in performance status of objects that are active during the one or more write operations. Filtering the performance metric data 302 permits the user to identify objects and object performance that is being influenced or affected by particular read operations or write operations.

Database 300 optionally includes a set of one or more performance thresholds 306. The set of performance thresholds 306 includes at least one performance threshold 308. The performance threshold 308 defines an acceptable range of performance for a particular object relative to a given performance metric. The performance status of an object is determined relative to the performance threshold 308.

Determining a performance status relative to the threshold 308 refers to comparing a given performance status of an object to the threshold. The performance status may be within the acceptable threshold if the performance of the object is above a threshold, below a threshold, more than the threshold, less than the threshold, or within a threshold range.

A performance threshold 308 in the set of performance thresholds 306 may be a user selected threshold or a default threshold for a particular type of object and metric. In some examples, the performance threshold 308 is a discreet threshold. For example, the performance threshold 308 may be a queue length of two. A performance status of a given disk object may be determined to be within the performance threshold if the queue length for the disk at a particular moment or point in time is equal to or less than the threshold queue length of two.

In other examples, a performance state of an object may be within a threshold if the performance state is equal to or exceeds a given threshold. For example, a threshold for a cache object may be a cache hit of five percent (5%). If the performance state of the object indicates the cache hit is equal to or greater than five percent, the performance state of the object is within the threshold. If the cache hit ratio falls below the five percent cache hit threshold, the performance state is considered outside the threshold indicating a performance problem with the cache object.

In still other examples, the performance threshold 308 is a threshold range. A threshold range is a range of acceptable performance values having both an acceptable high threshold value and an acceptable low threshold value. Any value falling between the high and low threshold values within the range are also acceptable values within the threshold range.

In some non-limiting examples, a metric for a disk may be queue length. The threshold for the disk may be a queue length below equal to or less than two (2) for an acceptable range, a queue length between two and six (6) for a warning zone, and a queue length of six or greater for a critical zone.

In other examples, a metric for measuring performance of a LUN, a file system, or a port includes latency. In some examples, a latency of less than ten (10) milliseconds is within a normal or acceptable threshold range. A latency greater than or equal to ten (10) milliseconds in this example would fall outside the acceptable threshold range. For example, latency between ten (10) milliseconds and twenty-five (25) milliseconds is outside the acceptable threshold and within a warning zone.

If the latency for the object exceeds twenty-five milliseconds (25 ms) then the object performance status is within a critical zone outside the acceptable performance threshold. If a performance status update indicates a performance status of a LUN, port, or file system object within this critical zone range at a given point in time, the performance indicator is altered or changed during playback of the animated performance dashboard display to change a color overlay of the performance indicator for the object to indicate the performance status of the object is within the critical zone.

In other examples, a metric for quantifying performance of a read cache includes a cache hit ratio percentage. In such examples, a cache hit ratio greater than five percent (5%) is within an acceptable range. If the cache hit ratio percentage falls to five percent (5%) or less the performance status of the cache is outside the acceptable threshold. In other words, a cache hit ratio that is less than the five percent threshold indicates the performance status is within a warning zone.

In some non-limiting examples, a metric for a write cache is cache dirty percentage. In such cases, the threshold may be an eighty percent (80%) threshold. A performance status indicating a cache dirty percentage less than eighty percent would be within an acceptable threshold range. If the cache dirty percentage is equal to or greater than the eighty percent threshold, the performance status of the object is outside the acceptable threshold range or within a warning zone. If the cache dirty percentage exceeds ninety percent (90%) the performance status of the object is within a critical zone.

For example, a threshold range for latency of a port may include a performance threshold of zero (0) to nine (9) milliseconds. Any latency performance status for the port which is zero, nine, or any value falling between zero and nine is within the threshold range and considered to be an acceptable performance status within the threshold.

The performance dashboard controller 304 generates a plurality of performance status updates 310 corresponding to a plurality of points 312 within a selected time range 314 for one or more objects. The time range 314 is a range of time having an upper bound and a lower bound encompassing the plurality of points 312. Each point in time within the plurality of points occurs at one or more intervals of time.

A performance status update 315 indicates a performance status of one or more objects at one or more points in time based on the performance metric data 302, one or more thresholds, such as performance threshold 308 for a selected metric. In this non-limiting example, the plurality of performance status updates 310 includes a first performance status 314 indicating a performance status of at least one object at a first point in time 320 and a second performance status of the at least one object at a second point in time 322.

For example, the first performance status 316 may indicate that a disk object queue length of one at seven forty-two (7:42 p.m.) is within a performance threshold where the performance threshold is a queue length of two. However, the second performance status 318 at the different point in time 322 may indicate that at seven fifty-two (7:52 p.m.), ten minutes after the first performance status 314, the queue length of the same disk object increased to a queue length of three (3), placing the performance status 318 of the disk object outside the acceptable performance threshold at the second point in time. In this example, the plurality of performance thresholds 306 indicates a potential performance problem associated with the disk queue length developing between 7:42 p.m. and 7:52 p.m. in the evening.

The animated performance dashboard display includes a plurality of performance indicators 324 representing a plurality of different objects. Each object is represented by a different performance indicator, such as performance indicator 326. Each performance indicator within the animated performance dashboard display provides a dynamic, animated graphical indicator for conveying changing performance information for a given object. Thus, the animated performance dashboard display provides performance information for a plurality of different objects at a plurality of different points in time to the user within a single display screen.

The performance dashboard controller 304 maps each performance status within the plurality of performance status updates 308 for a given object to a property of a performance indicator that is modifiable to graphically illustrate the change in the performance status relative to a threshold. In some examples, the property is a color overlay. The color overlays mapped to a given performance indicator at a plurality of points in time for playback within an animated performance dashboard display.

For example, a file system object may have a performance threshold latency of ten milliseconds for a first level of performance problems and a threshold latency of twenty-five milliseconds (25 ms) for a second level of performance problem.

In some examples, a performance status of an object that falls outside a performance threshold range by a first level indicates relatively minor performance problems that have not yet reached a critical level. The first level of performance problems may be referred to as a warning level. A performance status of an object that falls outside a performance threshold range by a second level indicates serious or critical performance problems. The second level of performance problems may be referred to as a critical level.

At a first point in time, the performance status 316 may indicate the performance is within an acceptable range for the file system. This performance status 314 may be mapped to a first color overlay 328. The first color overlay 328 may be any color corresponding to an acceptable performance range for the file system object. At the second point in time, thirty minutes later, the second performance status 318 may indicate the performance is now above the first warning threshold level but below the second critical threshold level. The performance dashboard controller 304 maps a second color overlay 330 to the performance indicator for the file system object corresponding to the second point in time to indicate the decline in performance of the file system with regard to the selected metric from the first point in time to the second point in time.

In some examples, the first color overlay 328 is a first color and the second color overlay 330 is a second color. The first color is a different color than the second color. The change in color from the first color to the second color indicates the change in performance of a particular object.

In the above example, a color or shade of the color overlay indicates a severity of a performance problem. In other words, different colors indicate different levels of performance problems. A red color may indicate a greater performance problem than a blue color. In another example, an orange color may indicate a more sever performance problem than a green color. Thus, the color of a given performance indicator graphic at a given point within playback of an animated performance dashboard display indicates the level of performance problems associated with the selected object at a data and/or time corresponding to the given point within the playback.

The performance dashboard controller 304 maps each color overlay for each point in the plurality of points to a given performance indicator for a given object to create a sequential set of color overlays. Each color overlay in the set of color overlays corresponds to a different point in time within a time range. For example, the first color overlay 328 corresponds to a first point in time, such as five o'clock (5:00 p.m.). The second color overlay 330 corresponds to the performance of the object at a second and different point in time within the time range, such as five minutes after five o'clock (5:05 p.m.). The different color overlays mapped to the plurality of points are displayed over the performance indicator sequentially to form an animated performance indicator for a given object.

In other words, the performance indicator 326 includes a series of color overlays, such as first color overlay 328 and second color overlay 330. Each color overlay corresponds to object performance of a given object at different points in time. Each color overlay is displayed with the performance indicator in sequence as a continuous animation within the animated performance dashboard display according to the time stamp or point in time associated with each color overlay. When the performance indicator 326 is displayed within the animated performance dashboard display, the first color overlay corresponding to a first point in time at 5:00 p.m. is rendered on the performance indicator 326 prior to the second color overlay corresponding to a second point in time at 5:05 p.m. In this manner, the color overlays are rendered sequentially in accordance with the point in time or time interval associated with each color overlay.

Thus, in some examples, color overlays are changed at each point in time within a set of time points to show changing performance status of one or more objects associated with the performance indicators. In other examples, color overlays are changed at each time interval within a set of time intervals to show changing performance status of one or more objects associated with the performance indicators.

Figure 4:
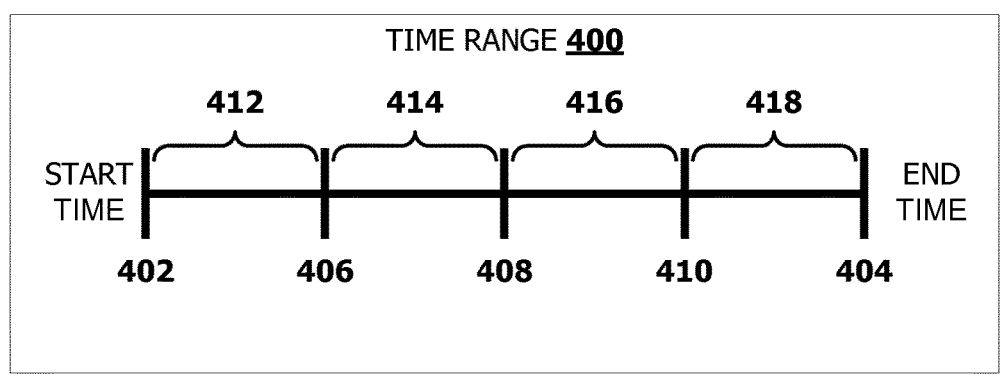
FIG. 4 is a block diagram of a time range.

FIG. 4 is a block diagram of a time range. A time range 400 is a range of time having a start time 402 and an end time 404. The start time 402 may be referred to as a starting point in time, an upper time bound, or a beginning time. The end time 404 may be referred to as a lower time bound, a stopping point, or an ending point in time. The time range 400 includes a plurality of points 402, 404, 406, 408, and 410 occurring at intervals 412, 414, 416, and 418.

A point in time is a static time, such as two o'clock (2:00 a.m.), three forty-five (3:45 p.m.) or five minutes and twenty-two seconds after one o'clock (1:05:22 p.m.). An interval is a gap or amount of time between individual points in time. An interval is a segment of time within the time range 400 bounded by a first point and a second point. For example, interval 412 is bounded by points 402 and 406. An interval may last any amount of time. An interval may be ten (10) milliseconds, one second, five (5) seconds, ten (10) minutes, thirty minutes, an hour, twenty-four (24) hours, a week, a month, a year, or any other time interval.

Each point within the plurality of points is determined based on a start time for the time range, an end time for the time range, and a time interval. The start time and end time are points within the time range. Other points within the time range are intervals of time within the time range. For example, if a time interval is five minutes, then a point within the plurality of points occurs every five minutes. If the start time is ten thirty, then the first point in time is ten thirty, a second point in time is ten thirty-five, a third point in time is ten forty, and so forth until the end time is reached.

For example, a time range 400 may be a time range having a start time 402 of two o'clock (2:00 a.m.) and an end time 404 of four minutes after two o'clock (2:04 a.m.) and having an interval of one minute. In this example, the plurality of points 402, 404, 406, 408, and 410 correspond to data gathered at one minute intervals. In other words, each point in the plurality of points may occur every one minute. So point in time 406 occurs at one minute after two o'clock (2:01 a.m.), point in time 408 occurs at two minutes after two o'clock (2:02 a.m.), point in time 410 occurs at three minutes after two o'clock (2:03 a.m.), and the end time 404 occurs at four minutes after two o'clock (2:04 a.m.).

Figure 5:
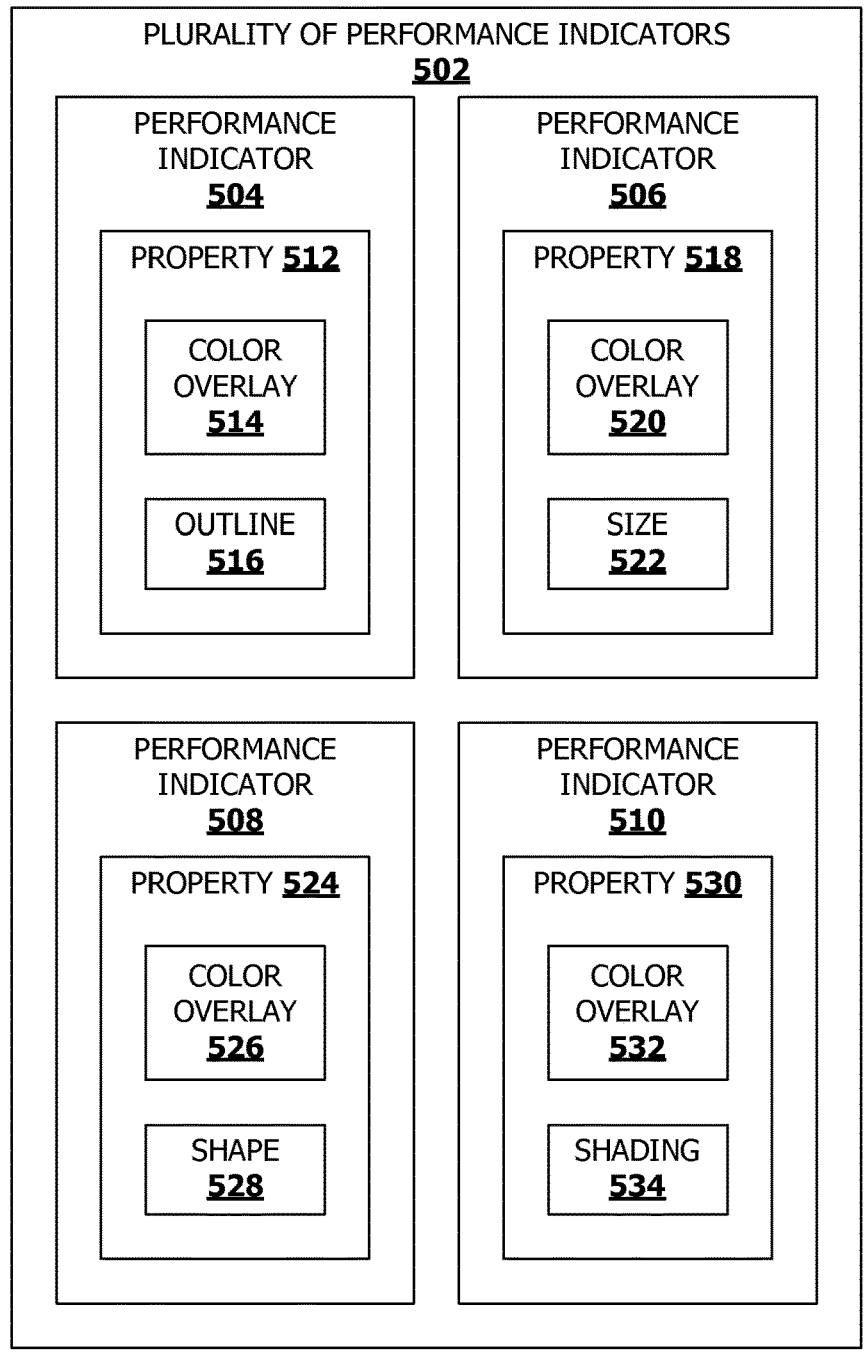
FIG. 5 is a block diagram of a plurality of performance indicators.

FIG. 5 is a block diagram of a plurality of performance indicators. Plurality of performance indicators 502 includes performance indicators representing a plurality of objects. In some examples, the plurality of objects are storage system objects, such as disks, file systems, processors, LUNs, ports, and other objects associated with a storage system.

Performance indicators 504, 506, 508, and 510 each represent a different object. Performance indicators 504, 506, 508, and 510 are displayed within a single animated performance dashboard display, such as animated dashboard display screen 600 shown in FIG. 6 below. Each performance indicator includes at least one property that may be altered during play time of the animated performance dashboard display to indicate changes in status of the object represented by the performance indicator.

For example, performance indicator 504 includes property 512. Property 512 includes a color overlay 514 and an outline 516 of the object. The color overlay 514 is a first color indicating that the performance of the object is within an acceptable threshold range. However, if the performance status should change at a given point during play of the animation, the color overlay 514 is dynamically changed from the first color to a second color to indicate the change in performance status during the playback. The color overlay is changed at a point in time during play of the animated display that corresponds to the actual time at which the performance of the object changed.

In some examples, a color overlay for an object is refreshed, updated, or changed at each point within the plurality of points. For example, performance indicator 504 may represent a processor with a threshold of seventy percent (70%) utilization. If a user selected time range begins at four o'clock (4:00 p.m.) and ends at five o'clock (5:00 p.m.) with an interval of thirty minutes, the performance indicator 504 is displayed with a first "green" color overlay at a point during playback of the animated corresponding to four o'clock. The green color indicating that performance of the processor at four o'clock was within the acceptable threshold range.

If, at the second point in time at four thirty (4:30 p.m.), the performance status update indicates the processor performance is at eighty percent (80%) which exceeds the threshold and is no longer within the acceptable range, the color overlay of the performance indicator 504 is changed to a second "yellow" color overlay at a point during playback of the animated performance display corresponding to four thirty. The second color overlay indicates the performance of the process is within a "warning" zone for processor performance relative to the processor performance threshold.

At a third point in time within the playback of the animated performance dashboard display corresponding to five o'clock, the performance status update indicates the performance status of the processor is at ninety percent (90%). The performance dashboard controller changes the color overlay from the second color overlay to a third "red" color overlay at the third point within the time range indicating the performance of the processor was within a critical range at approximately five o'clock in the evening.

Thus, in the above example, the playback of the animated performance indicator shows the performance indicator for the processor changing from a green color performance indicator at a first point in time corresponding to 4:00 p.m., to a yellow color performance indicator at a second point during playback corresponding to 4:30 p.m., and finally changing to a red color performance indicator at a third point during playback of the animated performance display indicating that the performance status of the process 5:00 p.m. was in a critical zone.

The outline 516 of performance indicator 504 may be altered to indicate one or more features of the object represented by the performance indicator 504. For example, a dashed or broken outline may indicate an unallocated disk space. A bold or dark outline may indicate an object that is being utilized by a particular application. A dark outline surrounding or enclosing two or more objects may indicate the enclosed objects are part of a group having some criteria or property in common, such as an array of storage devices.

Property 518 of performance indicator 506 may include a color overlay 520 and a size 522. Each object may be assigned a different set of color overlays. For example, performance indicator 506 may utilize a default green color to indicate performance within a threshold range, while performance indicator 506 may utilize a blue color to indicate performance of a different object within the threshold range. Thus, each object may use a different set of color overlays to convey the performance status of each different object.

In other examples, two or more objects utilize the same set of color overlays to convey similar information. In these examples, all performance indicators may utilize a common color to indicate performance within a threshold range, such as green. Likewise, all performance indicators may utilize a same color to indicate performance outside the performance threshold.

In some examples, different shades of a same color may be used to indicate a relative importance of the object based on criteria, such as activity level of one object relative to another object of the same object type. In other words, a color overlay indicates performance of an object relative to a performance threshold and shade of the color overlay indicates performance of one object relative to another object of the same type.

For example, two network ports, first network port and second network port, may be experiencing performance bottlenecks at the same point in time. The performance bottleneck is represented by a same color overlay. In this example, the performance of the network ports relative to a given threshold is indicated by a red overlay associated with the performance indicators for both the first network port and the second network port. The red overlay indicates both network ports exceed an acceptable performance threshold. However, the second network ports may be transferring a larger volume of traffic, thus garnering a darker shade of red. In other words, the color overlay for the performance indicator associated with the second network port is given a color overlay of a darker shade of red than the color overlay associated with the performance indicator for the first network port. The lighter shade of red indicates the first network port is has a smaller volume of traffic than the second network port.

In still other non-limiting examples, different shades of a same color may be used to represent different objects. For example, performance indicator 504 may include a green overlay of a first shade to indicate acceptable performance status of a first object while performance indicator 506 may utilize a green overlay of a second lighter shade of green to indicate acceptable performance status of a different second object represented by performance indicator 508. Likewise, performance indicator 510 may utilize a darker shade of green to indicate performance of a third object within an acceptable threshold range, and so forth.

In the same manner, different shades of yellow, red, blue, purple, orange, or any other color may be used to represent different performance status of different objects within a single performance dashboard display screen.

Size 522 of a performance indicator may also be altered during playback of an animated performance dashboard display to indicate a changing property or state of an object. In some examples, a size of a performance indicator is proportional to an available capacity of a storage object, such as a disk or flash drive. The size of a performance indicator may also indicate the proportional or relative size of a storage pool.

The size of the performance indicator may also be changed to indicate a change in performance status. For example, a size of a performance indicator may be increased to indicate the performance of the object is within a warning zone or within a critical zone. Likewise, a size of a performance indicator may shrink as the performance of the object returns to the acceptable performance threshold range.

Property 524 in this example includes color overlay 526 and shape 528. Color overlay 526 may include any color or shade of a color. Some non-limiting examples include red, yellow, orange, black, brown, purple, pink, green, white, and blue.

Shape 528 of a performance indicator may be utilized to convey information associated with a performance of an object as well as a type of object. For example, a storage object may be represented by a performance indicator having a somewhat cylindrical shape, while a processor or processor core object may be represented by a square shaped performance indicator.

Likewise, as a performance of an object deteriorate or begins approaching a warning zone or a critical zone, the shape of the performance indicator for the object may be altered. The shape may be changed from a square shape to a circular shape to indicate change in performance. In another example, the shape may be changed from a cylindrical shape to a shape overlaid with an "X" shape or some other shape to indicate critical performance problems.

Property 530 includes color overlay 532 and shading 534. Color overlay 532 in this example may include a combination of colors or transitioning/blending of colors. For example, as the performance of the object begins to slowly approach the threshold, the color overlay may increase shading 534 of the color overlay to gradually darken the color. If the color overlay indicating normal performance status is green, the shade of green may gradually be darkened to indicate the performance of the object is gradually moving towards the threshold. When the performance status update indicates the performance of the object is outside the threshold, the color may then be changed to yellow, orange, red, or whichever color indicates the performance is outside the acceptable threshold range.

Likewise, a shade of a color overlay may be gradually lightened or changed to a lighter shade to indicate a change in performance of the object as the performance improves or as the performance of the object deteriorates relative to the threshold.

In another example, the color overlay 532 may be gradually transitioned or partially changed to a second color to indicate performance is deteriorating or gradually moving closer to the threshold. For example, as the performance declines, a green overlay may be overlaid by yellow lines until the green overlay is completely covered in yellow. When the green overlay is fully converted to yellow, which indicates the performance is within the warning zone. Likewise, the yellow color overlay may be gradually overlaid by red lines to partially cover the yellow color overlay as the performance of the object continues to move closer to the critical zone. When the performance is fully within the critical zone, the color overlay is fully converted to a solid red color overlay.

In another example, a first color overlay may be gradually streaked or crossed by a second color overlay to partially change the color of the performance indicator showing a gradual, incremental change in performance status over time.

Figure 6:
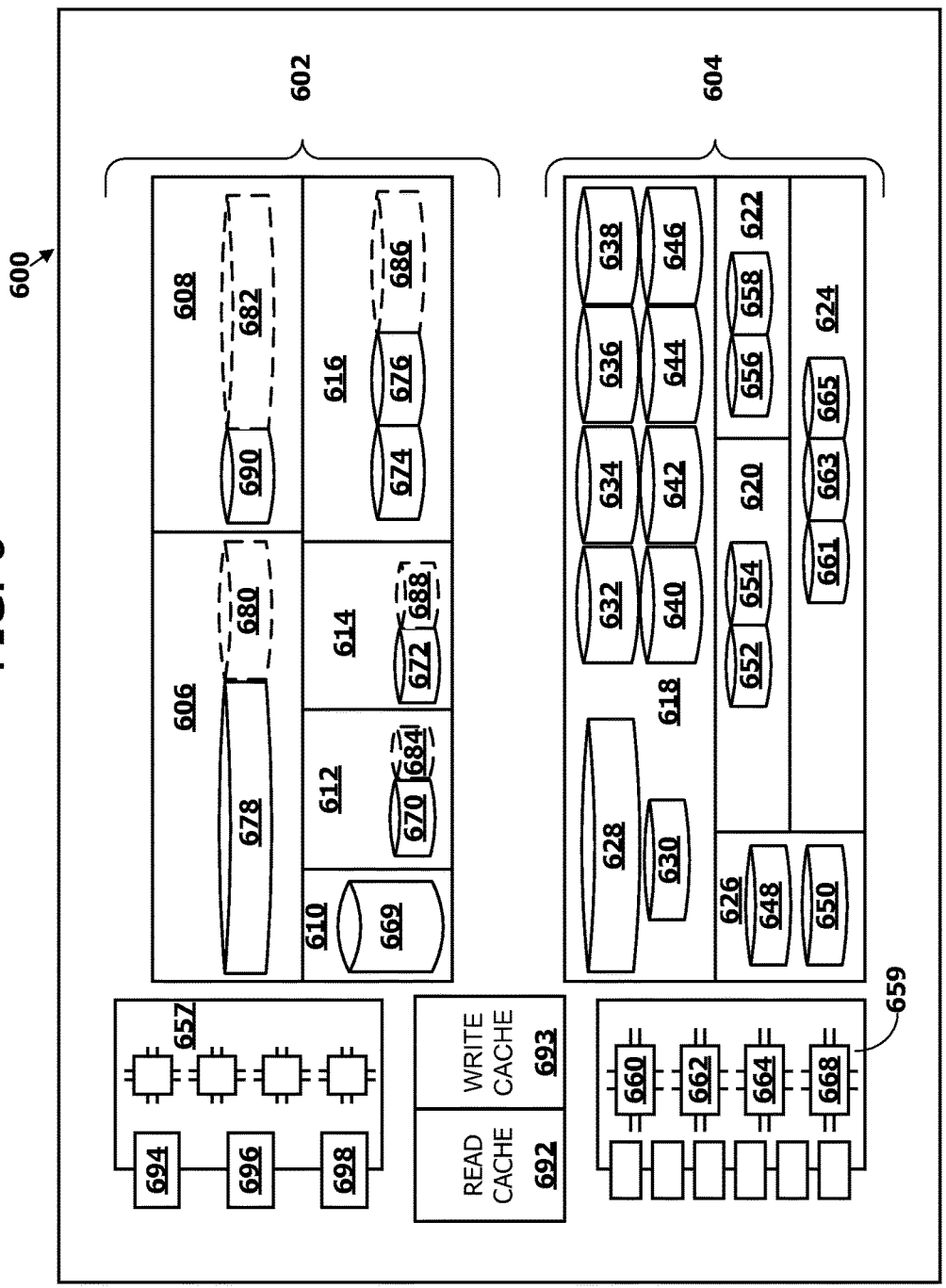
FIG. 6 is a block diagram illustrating a plurality of performance indicators representing a plurality of objects within a performance dashboard display.

FIG. 6 is a block diagram illustrating a plurality of performance indicators representing a plurality of objects within a performance dashboard display. The performance dashboard includes a visual, performance dashboard display providing a graphical representation of each object in a plurality of selected objects.

In some examples, the plurality of objects represented by the plurality of performance indicators within the animated performance dashboard display includes all the objects associated with a particular computing device. In other examples, a user may select two or more objects to form the plurality of objects represented within the animated performance dashboard display.

In still other examples, a user may select one or more grouping criteria. The one or more grouping criteria are applied to filter the plurality of objects to form a correlated set of objects. The plurality of performance indicators represents the correlated set of object. In other words, the animated performance dashboard display in these examples includes only performance indicators representing the correlated set of objects. The animated performance dashboard display represents changes in performance status of objects in the correlated set of objects over time. Objects that are not included within the correlated set of objects are not represented by performance indicators within the animated performance dashboard display. In other words, performance indicators representing objects excluded from the correlated set of objects are excluded from the animated performance dashboard display.

In this example, the performance dashboard display 600 optionally includes performance indicators representing a set of logical objects 602 and/or performance indicators representing a set of physical objects 604. The set of logical objects 602 may include graphical performance indicators representing one or more pools, such as pool objects 606, 608, 610, 612, 614, and 616. The set of physical objects 604 may also include graphical performance indicators representing one or more pools, such as pool objects 618, 620, 622, 624, and 626.

In some examples, the size of the box representing the pool object is proportional to the pool capacity. Thus, pool object 606 represented by a larger box than pool object 614 has greater pool capacity than pool object 614. For example, if pool 606 has ten terabytes of capacity and pool 614 has three terabytes of pool capacity, pool 606 is represented by a larger rectangle shaped box than pool object 614.

Data storage devices are represented by graphical performance indictors within the performance dashboard display. In this example, the size of the graphical representation of a data storage device is not proportional to the data storage device capacity. However, in other examples, the size of the graphical representation may be proportional to the capacity of the storage device.

Graphical performance indicators represent physical data storage devices, such as hard disks and flash drives. In this non-limiting example, graphical performance indicators 628, 630, 632, 634, 636, 638, 640, 642, 644, and 646 represent data storage devices associated with pool 618. Tiers may be distinguishable, as shown by data storage objects 628 and 630. Arrays may be distinguishable, such as array of storage devices 632, 634, 636, 638, 640, 642, 644, and 646.

Graphical performance indicators 648 and 650 correspond to physical data storage associated with pool 626. Pool 620 includes data storage objects 652 and 654. Pool 622 is associated with data storage objects 656 and 658. Finally, pool 626 is associated with physical data storage objects 661, 663, and 665. The set of physical data storage objects is not limited to the number of physical objects shown in FIG. 6. The set of physical objects may include more physical data storage objects or fewer physical storage devices than those shown in FIG. 6.

The set of logical objects 602 includes a plurality of graphical performance indicator icons representing one or more logical objects. The logical objects may include file system objects and logical units (LUNSs). The sizes of the LUN and file system objects in this example are proportional to their capacity. However, in other examples, the sizes of the performance indicators representing a LUN or file system may not be proportional to capacity of the file system or LUN.

The LUN objects may include thickly provisioned LUNs and thinly provisioned LUNs. The thick LUN objects may be visually distinguishable from the thin LUN objects. For example, thick LUNs may be represented by performance indicators that include shading, an icon identifying the thick LUN, a unique shape that is distinguishable from the shape of the performance indicator for a thin LUN, etc. In this example, graphical performance indicators 669, 674, 676, and 678 represent thickly provisioned LUNs.

The size of a thin LUN performance indicator may represent allocated capacity. In this non-limiting example, thin LUN objects are represented by graphical performance indicators 670 and 672. Unallocated space is identified by a dotted line, as shown by performance indicators 680, 682, 684, 686, and 688. The physical storage objects may also include file systems. In this example, performance indicator 690 represents a file system object.

The set of physical objects 604 may also include one or more storage processors 657 and 659. A storage processor may include one or more processor cores, such as CPU 660, 662, 664, and 668. Each core is identified separately in this example.

The performance dashboard display may optionally include a graphical performance indicator for each physical port, such as ports 694, 696, and 698. The ports may include Ethernet ports, Fibre Channel ports, as well as any other type of port.

The performance dashboard display may optionally include a graphical performance indicator for each cache, such as read cache 692 and write cache 693. In this example, the dynamic random access memory (DRAM) cache and flash cache are grouped separately under read cache 692 and write cache 693.

The animated performance dashboard display presents a plurality of performance indicators with changing color overlays to animate performance changes in the plurality of objects. However, in other examples, a user may select a single object to start playback of a particular performance indicator for that object. In other words, a user may select to play animation for only a single performance indicator for a single object within the animated performance dashboard display.

The objects represented in the animated performance dashboard display are a non-limiting example of objects that may be included within the animated performance dashboard. The examples are not limited to the number of objects or types of objects shown in FIG. 6. The animated performance dashboard display may include fewer objects than those shown or a greater number of objects than those shown in FIG. 6.

Figure 7:
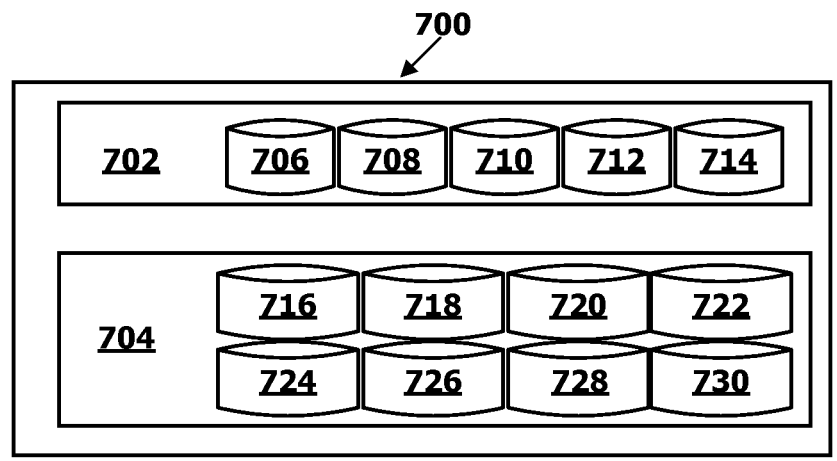
FIG. 7 is a block diagram illustrating a plurality of performance indicators representing a plurality of objects.

FIG. 7 is a block diagram illustrating a plurality of performance indicators representing a plurality of storage system objects. In this example, a graphical representation of a pool 700 associated with a performance dashboard display represents a RAID array 702 and RAID array 704. The RAID array group boundaries are denoted by boundary lines enclosing the physical data storage devices included within each RAID array. In this example, physical data storage devices within RAID array 702 are represented by graphical icons 706, 708, 710, 712, and 714. The physical data storage devices within RAID array 704 are represented by graphical icons 716, 718, 720, 722, 722, 724, 726, 728, and 730.

The example shown in FIG. 7 is a non-limiting example. The examples may be implemented with RAID arrays including more physical data storage devices than those shown in FIG. 7, as well as RAID arrays including fewer physical data storage devices than those shown in FIG. 7.

Figure 8:
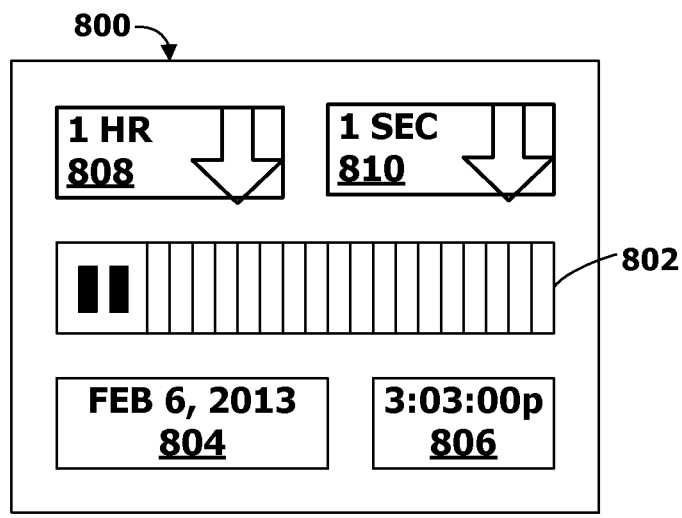
FIG. 8 is a block diagram illustrating a user control associated with a performance dashboard.

FIG. 8 is a block diagram illustrating a user control associated with a performance dashboard. The controller may be a control presented within a user interface. The user may select an interval of time using the controller 800. The user may select to play, pause, rewind, skip forward, or stop play of the animated performance dashboard display.

In some examples, the control 800 enables the user to select a time range 802 by entering a desired date 804 and time 806 to begin playing the animated performance dashboard display. Adding the play button to view the performance over time quickly highlights any performance problems as they develop during a selected time range.

The animated performance dashboard display provides an animated view of dynamically changing performance indicators showing changing performance status of objects. In some examples, a user may choose to play the animated performance dashboard display in reverse, increase playback speed, decrease playback speed, skip ahead within the playback by a given amount, or skip backwards within the playback by a given amount via control 800. For example, a user may select a point of time within the time range to pause the animation of the plurality of performance indicators at the selected point in time in a static view. The animation is paused at the selected point in time to create the static view.

In other examples, a user may start playback of the animated performance dashboard display by speaking a verbal command, typing a command, touching a touch screen, or any other means for triggering playback of the animated performance dashboard display.

The user may select any time within the time range by clicking the play bar at the desired time. For example, the user may skip forward one hour 808 or one second 810 by selecting the appropriate point in time or time interval during the playback.

Figure 9:
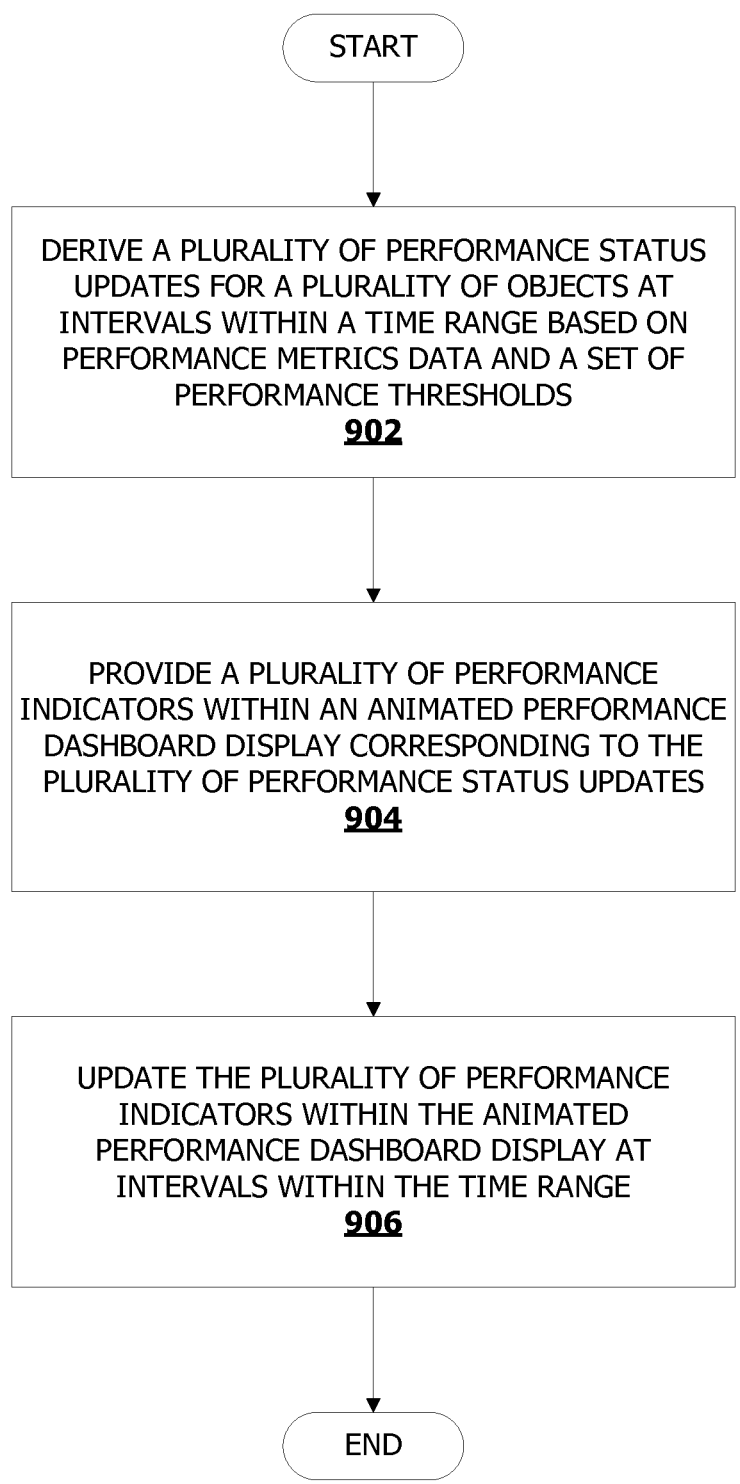
FIG. 9 is an exemplary flowchart illustrating generation of a plurality of performance status updates.

FIG. 9 is an exemplary flowchart illustrating generation of a plurality of performance status updates. The process shown in FIG. 9 may be implemented by a computing device, such as, but without limitation, computing device 100 in FIG. 1.

The process begin by receiving a plurality of performance status updates for an object at a plurality of points within a time range based on performance metric data and a threshold at operation 902. The process provides at least one performance indicator within an animated performance dashboard display at operation 904. The process updates the plurality of performance indicators within the animated performance dashboard display at intervals within the time range to form the animated display at operation 906. The process terminates thereafter.

While the operations illustrated in FIG. 9 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Figure 10:
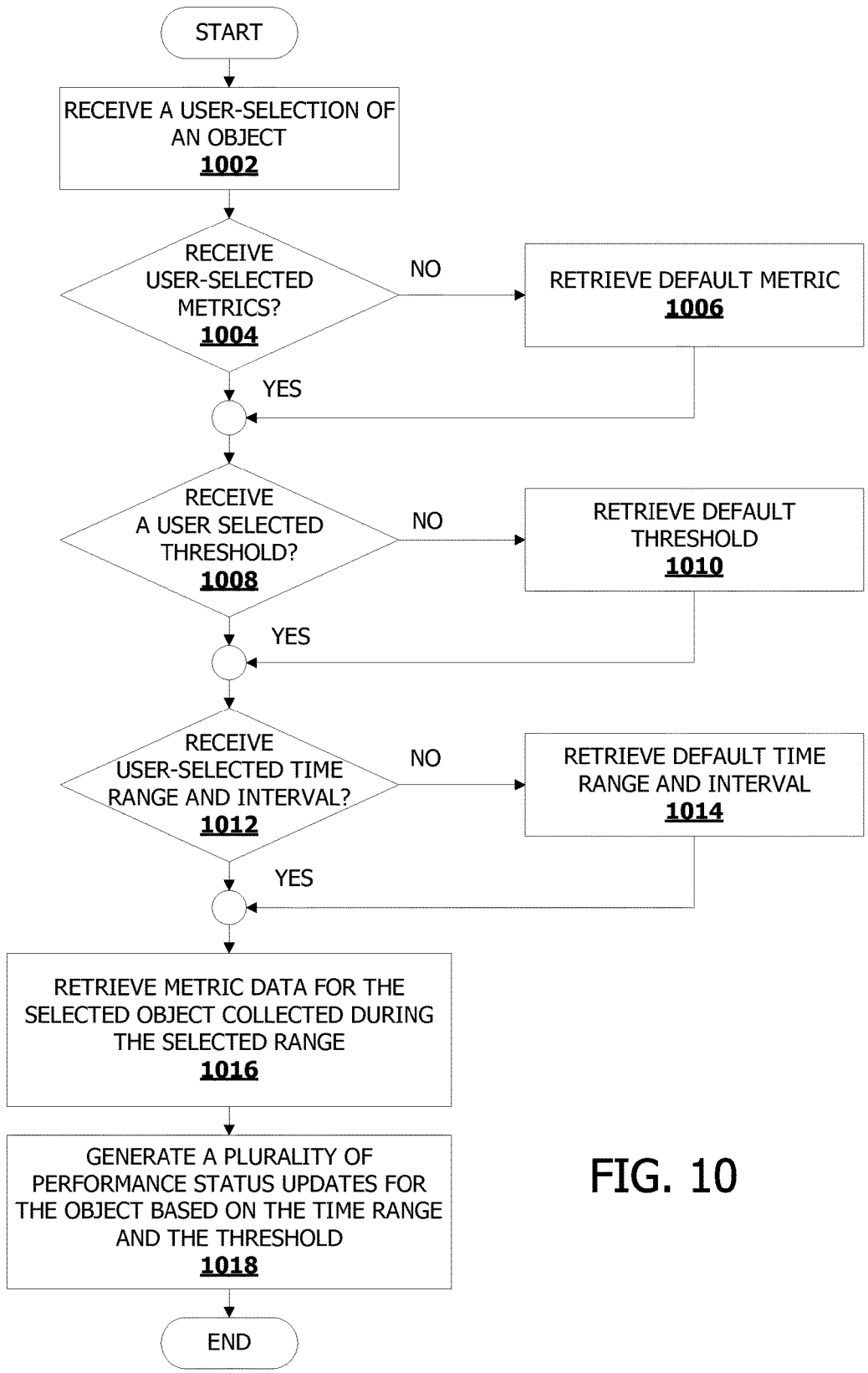
FIG. 10 is an exemplary flowchart illustrating generation of a performance status update for an object.

FIG. 10 is an exemplary flowchart illustrating generation of a performance status update for an object. The process shown in FIG. 10 may be implemented by a computing device, such as, but without limitation, computing device 100 in FIG. 1.

The process begins by receiving a user-selection of an object at operation 1002. The process determines whether a user-selected metric is received at operation 1004. If no, a default metric is retrieved at operation 1006. The process determines whether a user selected threshold is received at operation 1008. If no, a default threshold is retrieved at operation 1010.

The process determines whether a user selected time range and interval is received at operation 1012. If no, the process retrieves a default time range and interval at operation 1014. The process retrieves performance metric data for the selected object collected during the selected time range at operation 1016. The process generates a plurality of performance status updates for the object based on the time range and the threshold at operation 1018. The process terminates thereafter.

While the operations illustrated in FIG. 10 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Figure 11:
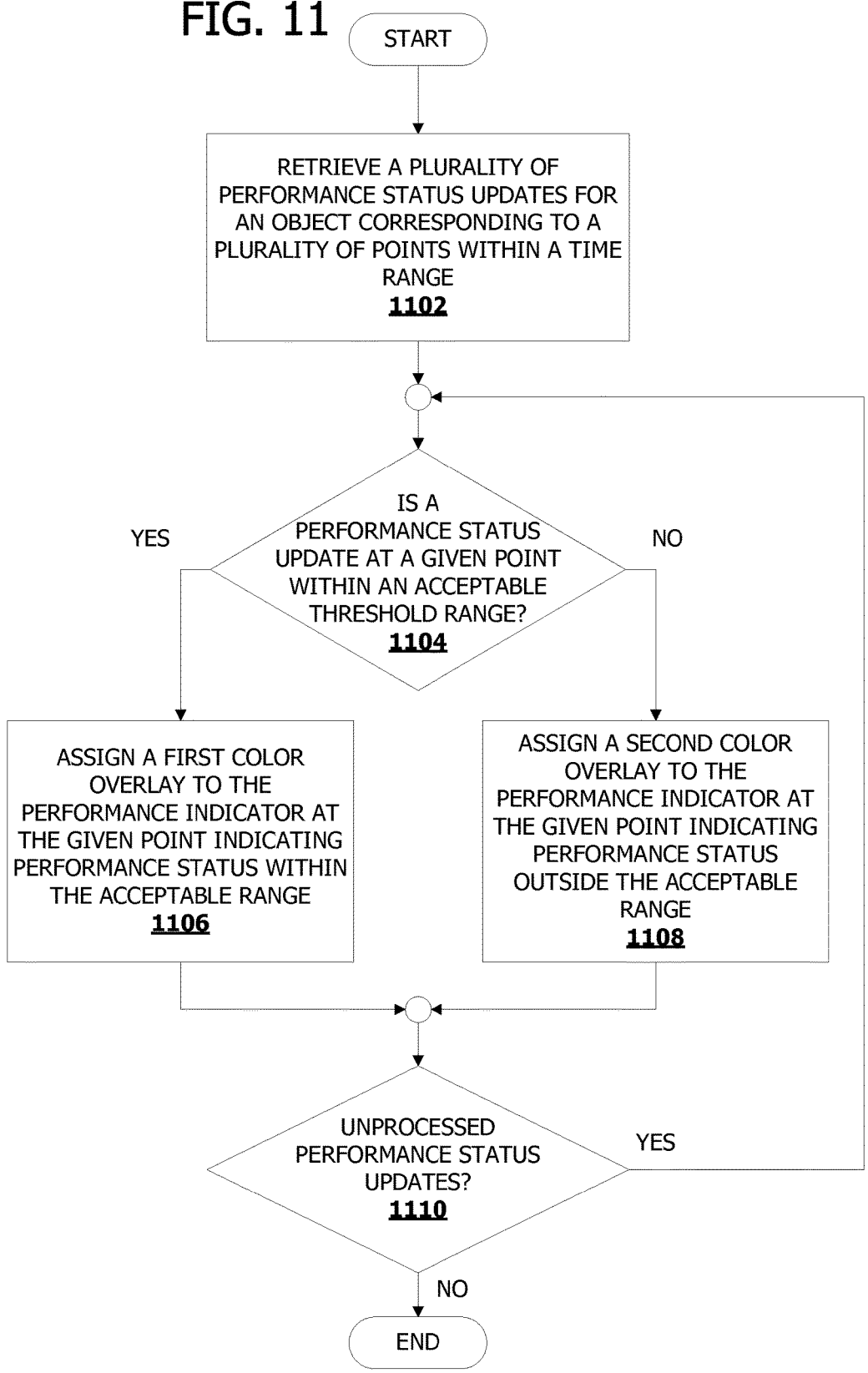
FIG. 11 is an exemplary flowchart illustrating changing a color overlay of a performance indicator in response to a change in a performance status.

FIG. 11 is an exemplary flowchart illustrating generating a plurality of performance status updates for an object. The process shown in FIG. 11 may be implemented by a computing device, such as, but without limitation, computing device 100 in FIG. 1.

The process receives a plurality of performance status updates for an object corresponding to a plurality of points within a time range at operation 1102. The process determines whether a performance status update for a given point in time is within an acceptable threshold range at operation 1104. If the performance status update is within an acceptable threshold range, the process assigns a first color overlay to the performance indicator at a point within playback of the animated performance dashboard display corresponding to the given point in time and indicating performance status is outside an acceptable range at operation 1106.

Returning to operation 1104, if the performance status update indicates the performance status is not within an acceptable threshold range, the process assigns a second color overlay to the performance indicator at a point within the playback of the animated performance dashboard display corresponding to the given point in time and indicating performance status is outside an acceptable range at operation 1108.

The process determines whether performance status updates are unprocessed at operation 1110. If no, the process terminates thereafter.

If there are unprocessed performance status updates at operation 1110, the process returns to operation 1104 and iteratively performs operations 1104 to 1110 until all performance status updates are processed during play of the animated performance dashboard display. If there are no unprocessed performance status updates at operation 1110, the process terminates thereafter.

While the operations illustrated in FIG. 11 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Figure 12:
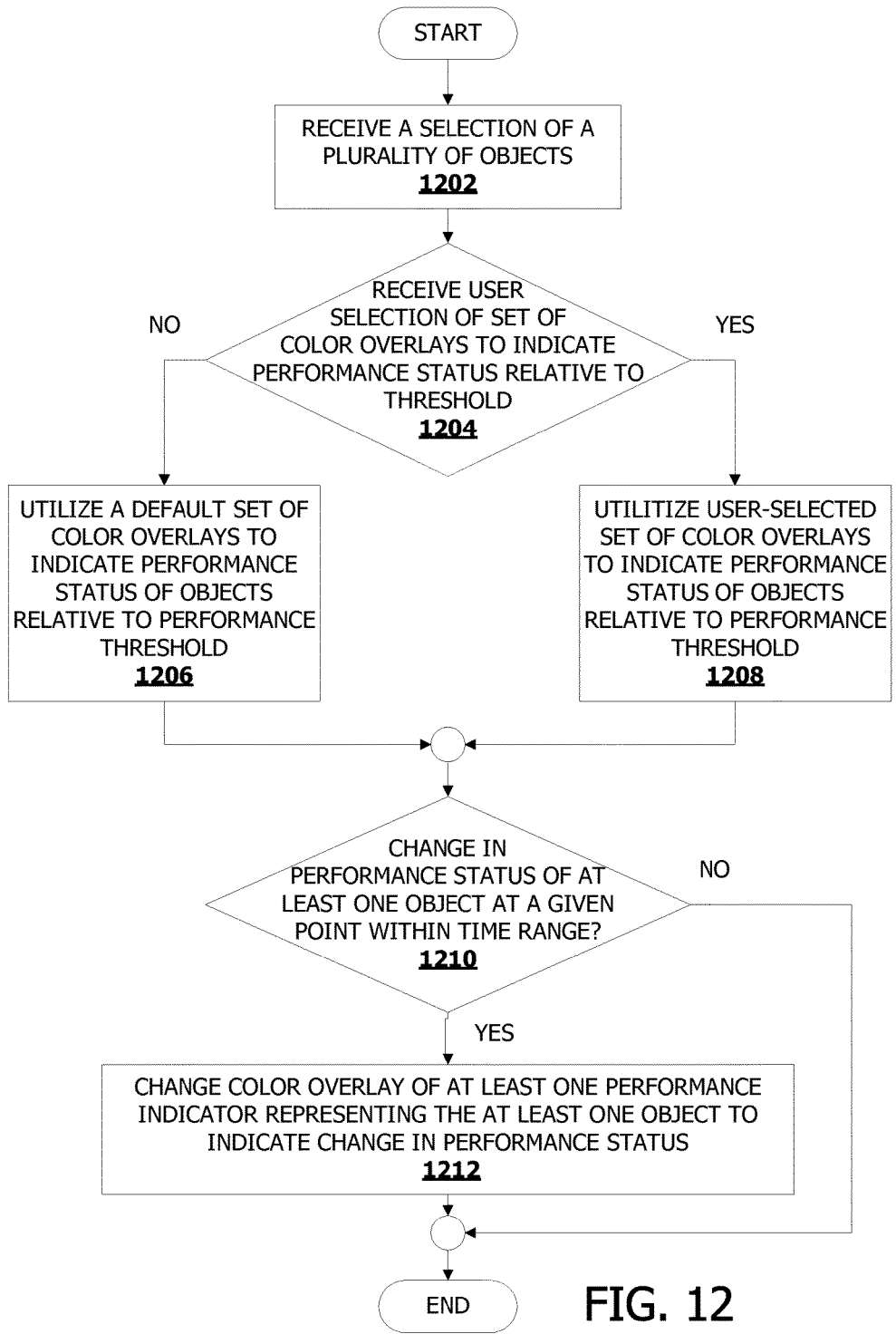
FIG. 12 is an exemplary flowchart illustrating updating a performance indicator during playback within an animated performance dashboard display based on a plurality of performance status updates for an object.

FIG. 12 is an exemplary flowchart illustrating updating a performance indicator during playback within an animated performance dashboard display based on a plurality of performance status updates for an object. The process shown in FIG. 12 may be implemented by a computing device, such as, but without limitation, computing device 100 in FIG. 1.

The process begins by receiving a user selection of a plurality of objects at operation 1202. The process determines whether a user selection of a set of color overlays for indicating performance status relative to the performance threshold is received at operation 1204. If no, the process utilizes a set of default color overlays for indicating performance status of one or more objects relative to the performance threshold at operation 1206. If yes at operation 1240, the process utilizes the user-selected set of color overlays to indicate performance status of objects relative to performance threshold at operation 1208.

The process determines whether there is a change in performance status of at least one object at a given point within the time range at operation 1210. If no, the process terminates thereafter.

Returning to operation 1210, if there is a change in performance status of at least one object, the process changes a color overlay of at least one performance indicator representing the at least one object to indicate the change in performance status at operation 1212. The process terminates thereafter.

While the operations illustrated in FIG. 12 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Additional Examples

In some examples, one or more computer storage media embodying computer executable components are provided. The components include a performance dashboard controller that, when executed, cause at least one processor to generate an animated performance dashboard display. The animated performance dashboard display includes a plurality of performance indicators representing a plurality of objects. A given performance indicator identifying a performance status of a given object at a given point in time relative to at least one performance threshold. The performance dashboard controller is further executed by the one or more processors to update the plurality of performance indicators at intervals within a time range to animate changes in the performance status of the plurality of objects throughout the time range. Updating the plurality of performance indicators further includes changing a property of at least one performance indicator to identify a change from a first performance status of at least one object at a first point in time to a second performance status of the at least one object at a second point in time within the time range.

In another example scenario, a data storage system includes data storage, the data storage including one or more data storage devices. A storage processor is coupled to the data storage. The storage processor includes one or more processors. A plurality of storage system objects includes a set of physical objects and a set of logical objects of the data storage system. A user interface includes an animated performance dashboard display. The animated performance dashboard display includes a plurality of performance indicators representing the plurality of storage system objects. A given performance indicator identifies a performance status of a given object at a given point in time within a time range relative to a given performance threshold for the given object. The performance indicator includes a color overlay indicating whether the performance status of the given object is within the given performance threshold for the object at a given time interval within the time range. A performance dashboard controller executing on the one or more processors changes one or more color overlays of one or more performance indicators within the animated performance dashboard display during playback of an animated performance dashboard display to animate changing performance status of the plurality of objects during the time range.

At least a portion of the functionality of the various elements in FIG. 1 may be performed by other elements in FIG. 2, FIG. 3, FIG. 4, or an entity (e.g., processor, web service, server, application program, computing device, etc.) not shown in FIG. 1. In some examples, operation illustrated in FIG. 9, FIG. 10, FIG. 11, FIG. 12, and FIG. 13 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for animating performance metric data for a plurality of object within a single display screen for a plurality of points within a time range. For example, the elements illustrated in FIG. 1, such as when encoded to perform the operations illustrated in FIG. 9, FIG. 10, FIG. 11, and FIG. 12, constitute exemplary means for creating an animated performance dashboard display representing changing performance status of a plurality of objects at a plurality of points in time based on performance metric data and a performance threshold.

More specifically, the performance dashboard controller illustrated in FIG. 1, such as when encoded to perform the operations illustrated in FIG. 9, constitute exemplary means for receiving a plurality of performance status updates for a plurality of objects, exemplary means for generating a plurality of performance indicators corresponding to the plurality of performance status updates, and exemplary means for animating the plurality of performance indicators within an animated performance dashboard display associated with a user interface.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:
   receiving a plurality of performance status updates for a plurality of objects, the plurality of objects including a plurality of data storage devices, the plurality of performance status updates corresponding to a plurality of points within a time range, a performance status update identifying a performance status of a given data storage device at a given point within the time range based on at least one metric;
   generating a plurality of performance indicators corresponding to the plurality of performance status updates, by the one or more processors, a performance indicator comprising a color overlay indicating the performance status of the given data storage device relative to a performance threshold;
   displaying a view of the plurality of performance indicators within an animated performance dashboard display associated with a user interface, the view of the plurality of performance indicators representing performance statuses of the respective data storage devices, wherein the view includes, for one or more of the plurality of performance indicators, a graphical symbolic representation of each data storage device, the graphical symbolic representation of the data storage device having a first color overlay and a second color overlay, wherein a first color of the first color overlay indicates a first performance status of the data storage device at a first point within the time range, and wherein a second color of the second color overlay indicates a second performance status of the data storage device at a second point within the time range;
   animating the plurality of performance indicators within the animated performance dashboard display associated with the user interface, the animating of the plurality of performance indicators including changing the first color of the first color overlay indicating the first performance status of the data storage device at the first point within the time range to the second color of the second color overlay indicating the second performance status of the data storage device at the second point within the time range, wherein the graphical symbolic representation is a perspective view representation of the data storage device, the perspective view representation having a cylindrical shape with opposed substantially circular surfaces, a first size, and a second size;
   determining the first size of the perspective view representation of the data storage device based on a first capacity of the data storage device at a third point within the time range; and
   determining the second size of the perspective view representation of the data storage device based on a second capacity of the data storage device at a fourth point within the time range,
   wherein the animating of the plurality of performance indicators within the animated performance dashboard display further includes changing the first size of the perspective view representation of the data storage device at the third point within the time range to the second size of the perspective view representation of the data storage device at the fourth point within the time range.

2. The computer-implemented method of claim 1, wherein the first color of the first color overlay indicates that the first performance status of the data storage device is within the performance threshold at a first time interval, and
   wherein the animating of the plurality of performance indicators includes:
      upon determining, at a second time interval, that the first performance status of the data storage device exceeds the performance threshold by a first level, changing, at the second time interval, the first color of the first color overlay to the second color of the second color overlay indicating the second performance status of the data storage device; and
      upon determining, at a third time interval, that the second performance status of the data storage device exceeds the performance threshold by a second level, changing, at the third time interval, the second color of the second color overlay to a third color of a third color overlay indicating a third performance status of the data storage device, wherein the third color is different from the first color and the second color.

3. The computer-implemented method of claim 1, wherein the displaying of the view of the plurality of performance indicators includes:
   displaying a first performance indicator for a first data storage device, the first performance indicator comprising the first color overlay having a first color shade; and
   displaying a second performance indicator for a second data storage device, the second performance indicator comprising the second color overlay having a second color shade, wherein the second color shade is different from the first color shade.

4. The computer-implemented method of claim 1, further comprising:
   deriving the plurality of performance status updates for the plurality of data storage devices at a set of intervals within the time range based on performance metric data for the plurality of data storage devices and a set of performance thresholds, the performance metric data comprising performance data for a data storage device from the plurality of data storage devices relative to a selected metric.

5. The computer-implemented method of claim 4, further comprising:
   filtering the performance metric data in accordance with at least one read operation, wherein the animated performance dashboard display animates changing performance status of the plurality of data storage devices relative to the at least one read operation.

6. The computer-implemented method of claim 4, further comprising:
   filtering the performance metric data in accordance with at least one write operation, wherein the animated performance dashboard display animates the changing performance status of the plurality of data storage devices relative to the at least one write operation.

7. The computer-implemented method of claim 4, further comprising:
filtering the performance metric data in accordance with at least one selected application, wherein the animated performance dashboard display animates the changing performance status of the plurality of data storage devices relative to operations associated with the at least one selected application.

8. The computer-implemented method of claim 1, further comprising:
on receiving a user selection of a point of time within the time range, pausing animation of the plurality of performance indicators at the selected point in time in a static view, wherein the animation is paused at the selected point in time.

9. The computer-implemented method of claim 1, further comprising:
receiving a user selected group criteria;
applying the group criteria to filter the plurality of data storage devices to form a correlated set of data storage devices; and
providing the plurality of performance indicators within the animated performance dashboard display, wherein in the plurality of performance indicators represent the correlated set of data storage devices, and wherein the animated performance dashboard display represents changes in performance status of data storage devices in the correlated set of data storage devices over time.

10. One or more computer storage media embodying computer executable components, said components comprising a performance dashboard controller that, when executed, cause at least one processor to:
generate an animated performance dashboard display, the animated performance dashboard display comprising a plurality of performance indicators representing a plurality of objects, the plurality of objects including a plurality of data storage devices, a given performance indicator identifying a performance status of a given data storage device at a given point in time relative to at least one performance threshold;
display a view of the plurality of performance indicators within the animated performance dashboard display, the view of the plurality of performance indicators representing performance statuses of the respective data storage devices, wherein the view includes, for one or more of the plurality of performance indicators, a graphical symbolic representation of each data storage device, the graphical symbolic representation of the data storage device having a first color overlay and a second color overlay, wherein a first color of the first color overlay indicates a first performance status of the data storage device at a first point within a time range relative to the at least one performance threshold, and wherein a second color of the second color overlay indicates a second performance status of the data storage device at a second point within the time range;
update the plurality of performance indicators at intervals within the time range to animate changes in the performance statuses of the respective data storage devices throughout the time range, the updating of the plurality of performance indicators including changing the first color of the first color overlay of the graphical symbolic representation of the data storage device at the first point within the time range to the second color of the second color overlay of the graphical symbolic representation of the data storage device at the second point within the time range, wherein the graphical symbolic representation is a perspective view representation of the data storage device, the perspective view representation having a cylindrical shape with opposed substantially circular surfaces, a first size, and a second size;
determine the first size of the perspective view representation of the data storage device based on a first capacity of the data storage device at a third point within the time range;
determine the second size of the perspective view representation of the data storage device based on a second capacity of the data storage device at a second fourth point within the time range; and
update the plurality of performance indicators at the intervals within the time range to animate the changes in the performance statuses of the respective data storage devices throughout the time range, the updating of the plurality of performance indicators further including changing the first size of the perspective view representation of the data storage device at the third point within the time range to the second size of the perspective view representation of the data storage device fourth point within the time range.

11. The computer storage media of claim 10, wherein the first color of the first color overlay is a green color indicating a normal performance status, and wherein the second color of the second color overlay is a red color overlay indicating a critical performance status.

12. The computer storage media of claim 10, wherein perspective view representation of the data storage device has an outline, and
wherein the updating of the plurality of performance indicators at the intervals within the time range further includes changing the outline of the perspective view representation of the data storage device to identify a change from the first capacity of the data storage device to the second capacity of the data storage device.

13. The computer storage media of claim 10, wherein at least one of the plurality of data storage devices is a storage pool, and wherein the performance dashboard controller is further executed to cause the at least one processor to:
indicate a pool capacity of the storage pool, wherein a third size of the storage pool represents the pool capacity of the storage pool.

14. A data storage system comprising:
a data storage comprising a plurality of data storage devices, the plurality of data storage devices comprising a set of physical data storage devices and a set of logical data storage devices;
a storage processor coupled to the data storage, the storage processor comprising one or more processors;
a user interface operative to display a view of a plurality of performance indicators within an animated performance dashboard display, the plurality of performance indicators representing the plurality of data storage devices, a given performance indicator identifying a performance status of a given data storage device at a given point within a time range relative to a given performance threshold for the given data storage device, the performance indicator comprising a color overlay indicating whether the performance status of the given data storage device is within the given performance threshold for the data storage device at a given time interval within the time range,
wherein the view includes, for one or more of the plurality of performance indicators, a graphical symbolic representation of each data storage device, the graphical symbolic representation of the data storage device having a first color overlay and a second color overlay, wherein a first color of the first color overlay indicates a first performance status of the data storage device at a first point within the time range, and wherein a second color of the second color overlay indicates a second performance status of the data storage device at a second point within the time range; and a performance dashboard controller executing on the storage processor, the performance dashboard controller changing, within the animated performance dashboard display during playback, the first color of the first color overlay indicating the first performance status of the data storage device at the first point within the time range to the second color of the second color overlay indicating the second performance status of the data storage device at the second point within the time range, wherein the graphical symbolic representation is a perspective view representation of the data storage device, the perspective view representation having a cylindrical shape with opposed substantially circular surfaces, a first size, and a second size, and wherein the performance dashboard controller (i) determines the first size of the perspective view representation of the data storage device based on a first capacity of the data storage device at a third point within the time range, (ii) determines the second size of the perspective view representation of the data storage device based on a second capacity of the data storage device at a fourth point within the time range, and (iii) changes, within the animated performance dashboard display during the playback, the first size of the perspective view representation of the data storage device at the third point within the time range to the second size of the perspective view representation of the data storage device at the fourth point within the time range to animate changing performance statuses of the plurality of data storage devices during the time range.

15. The data storage system of claim 14, further comprising:

a performance monitor, wherein the performance monitor polls the plurality of data storage devices for performance metric data and stores the performance metric data in a database, the performance metric data comprising performance data for at least one data storage device from the plurality of data storage devices relative to at least one selected metric.

16. The data storage system of claim 14, the animated performance dashboard display further comprising:

a physical data storage devices compartment comprising a set of performance indicators representing the set of physical data storage devices; and a logical data storage devices compartment comprising a set of performance indicators representing the set of logical data storage devices.

17. The data storage system of claim 14, wherein the set of physical data storage devices incorporates a set of processors, and wherein the set of logical data storage devices incorporates at least one of a set of logical units (LUNs) and a set of file systems.

18. The data storage system of claim 14, further comprising:

a performance metric associated with a data storage device from the plurality of data storage devices, the at least one performance metric comprising a latency, queue length, processor utilization, cache hit ratio, cache dirty percentage, or bandwidth.

19. The data storage system of claim 14, wherein the animated performance dashboard display further comprises:

a first performance indicator representing a first data storage device, the first performance indicator comprising a first shade of the first color of the first color overlay; and a second performance indicator representing a second data storage device, the second performance indicator comprising a second shade of the first color of the first color overlay, wherein the second shade is different from the first shade.

\* \* \* \* \*